US012683485B2

(12) United States Patent
Scott et al.

(10) Patent No.:   US 12,683,485 B2
(45) Date of Patent:      Jul. 14, 2026

(54) RIPPLE REDUCTION FOR DIRECT CURRENT-TO-DIRECT CURRENT (DC-DC) CONVERTERS

(71) Applicant: Qorvo US, Inc., Greensboro, NC (US)

(72) Inventors: Baker Scott, San Jose, CA (US); Nadim Khlat, Cugnaux (FR); George Maxim, Saratoga, CA (US); David Edward Reed, Calhan, CO (US); Stephen James Franck, Felton, CA (US)

(73) Assignee: Qorvo US, Inc., Greensboro, NC (US)

( * ) Notice:   Subject to any disclaimer, the term of this patent is extended or adjusted under 35 U.S.C. 154(b) by 0 days.

(21) Appl. No.: 19/032,664

(22) Filed:     Jan. 21, 2025

(65)             Prior Publication Data

US 2025/0266753 A1      Aug. 21, 2025

Related U.S. Application Data

(60) Provisional application No. 63/555,292, filed on Feb. 19, 2024.

(51) Int. Cl.
  H02M 1/14        (2006.01)
  H02M 1/00        (2007.01)
(52) U.S. Cl.
  CPC ........... H02M 1/14 (2013.01); H02M 1/0009 (2021.05); H02M 1/0019 (2021.05)

(58) Field of Classification Search
  CPC ..... H02M 1/14; H02M 1/0009; H02M 1/0019
  See application file for complete search history.

(56)                References Cited

U.S. PATENT DOCUMENTS

| | | | |
|---|---|---|---|
| 8,593,125 B1 | 11/2013 | Xue | |
| 9,325,242 B2 | 4/2016 | Babazadeh et al. | |
| 11,183,928 B2 * | 11/2021 | Cao ........................ | H02M 3/156 |
| 12,301,096 B2 * | 5/2025 | Qaiyum .................. | H03K 5/24 |
| 2023/0223849 A1 * | 7/2023 | Li ........................ | H02M 1/0025 |
| | | | 323/247 |
| 2024/0162802 A1 * | 5/2024 | Yun ....................... | H02M 3/158 |

* cited by examiner

*Primary Examiner* — Carlos Amaya
(74) *Attorney, Agent, or Firm* — Withrow & Terranova, P.L.L.C.

(57)            ABSTRACT

Systems and methods for ripple reduction for direct current-to-direct current (DC-DC) converters are disclosed. In one aspect, ripple is reduced by measuring a load current proxy and providing a fast-acting feedback loop to the DC-DC converter to adjust current levels to a desired level. In particular, a change in voltage at and output may be measured, and its derivative (dV/dt) calculated and multiplied by a capacitance to determine the load current. In a second aspect, two DC-DC converters are used, where low-frequency current changes are handled by a first DC-DC converter, mid-frequency current changes are handled by the second DC-DC converter, and fast-frequency current changes are handled by the capacitor associated with the capacitance of the first aspect.

18 Claims, 11 Drawing Sheets

RIPPLE REDUCTION FOR DIRECT CURRENT-TO-DIRECT CURRENT (DC-DC) CONVERTERS

PRIORITY APPLICATION

The present application claims priority to U.S. Provisional Patent Application Ser. No. 63/555,292, filed on Feb. 19, 2024, and entitled "RIPPLE REDUCTION FOR DIRECT CURRENT-TO-DIRECT CURRENT (DC-DC) CONVERTERS," the contents of which are incorporated herein by reference in its entirety.

BACKGROUND

I. Field of the Disclosure

The technology of the disclosure relates generally to power converters such as direct current-to-direct current (DC-DC) converters and techniques to reduce ripple from load current fluctuations.

II. Background

Computing devices abound in modern society, and more particularly, mobile communication devices have become increasingly common. The prevalence of these mobile communication devices is driven in part by the many functions that are now enabled on such devices. Increased processing capabilities in such devices means that mobile communication devices have evolved from pure communication tools into sophisticated mobile entertainment centers, thus enabling enhanced user experiences. With the advent of the myriad functions available to such devices, there has been increased pressure to find ways to increase the bandwidth available for data used by applications on mobile communication devices. This pressure has resulted in the continued evolution of wireless communication protocols. More recent wireless communication protocols require frequent changes in signal power levels, which puts strains on power amplifiers used to boost signals to desired power levels. To improve the efficiency of such power amplifiers, power tracking circuits may change supply voltages for the power amplifiers. As the pace of power level changes increases, there is room for innovation in keeping these power amplifiers efficient while meeting the increasing frequency of power level changes.

SUMMARY

Aspects disclosed in the detailed description include systems and methods for ripple reduction for direct current-to-direct current (DC-DC) converters. In a first aspect, ripple is reduced by measuring a load current proxy and providing a fast-acting feedback loop to the DC-DC converter to adjust current levels to a desired level. In particular, a change in voltage at an output may be measured and its derivative (dV/dt) calculated and multiplied by a capacitance to determine the load current. In a second aspect, two DC-DC converters are used, where low-frequency current changes are handled by a first DC-DC converter, mid-frequency current changes are handled by the second DC-DC converter, and fast-frequency current changes are handled by the capacitor associated with the capacitance of the first aspect. Either of these aspects will reduce ripple for a load associated with the DC-DC converters. Greater ripple reduction allows for more efficient operation of the load (e.g., a power amplifier), which in turn provides overall power savings and better compliance with the more recent wireless standards.

In this regard, in one aspect, a power management circuit is disclosed. The power management circuit includes a DC-DC converter configured to provide an output control signal to a load at an output node through at least an inductor, a capacitor coupling the output node to ground, and a first current sensor associated with the inductor configured to provide a first current feedback signal. The power management circuit further includes a voltage sensor associated with the output node configured to provide a voltage feedback signal and a second current sensor associated with the capacitor configured to provide a second current feedback signal.

In another aspect, a communication device is disclosed. The communication device includes a baseband processor and a transceiver circuit coupled to the baseband processor. The communication device also includes a front-end module (FEM) comprising a power management circuit, the power management circuit comprising: a DC-DC converter configured to provide an output control signal to a load at an output node through at least an inductor, a capacitor coupling the output node to ground, a first current sensor associated with the inductor configured to provide a first current feedback signal, a voltage sensor associated with the output node configured to provide a voltage feedback signal, and a second current sensor associated with the capacitor configured to provide a second current feedback signal.

In another aspect, a method of operating a power management circuit is disclosed. The method includes sensing a first current across an inductor associated with a DC-DC converter with a first current sensor, sensing a second current by sensing a change in voltage for a capacitor at an output node of the DC-DC converter and adjusting the DC-DC converter based on the first current and the second current.

In another aspect, a power management circuit is disclosed. The power management circuit includes an output node, a first DC-DC converter coupled to the output node through a first inductor, the first DC-DC converter configured to provide DC components to an output control signal at the output node, and a second DC-DC converter coupled to the output node through a second inductor and a DC blocking capacitor, the second DC-DC converter configured to provide alternating current (AC) components to the output control signal.

In another aspect, a method of controlling a power management circuit is disclosed. The method includes outputting a low-frequency signal using a first DC-DC converter, outputting a medium-frequency signal using a second DC-DC converter while blocking low-frequency signals from the second DC-DC converter, and adjusting output from at least the first DC-DC converter using a current feedback loop and a voltage feedback loop.

DETAILED DESCRIPTION

Figure 1:
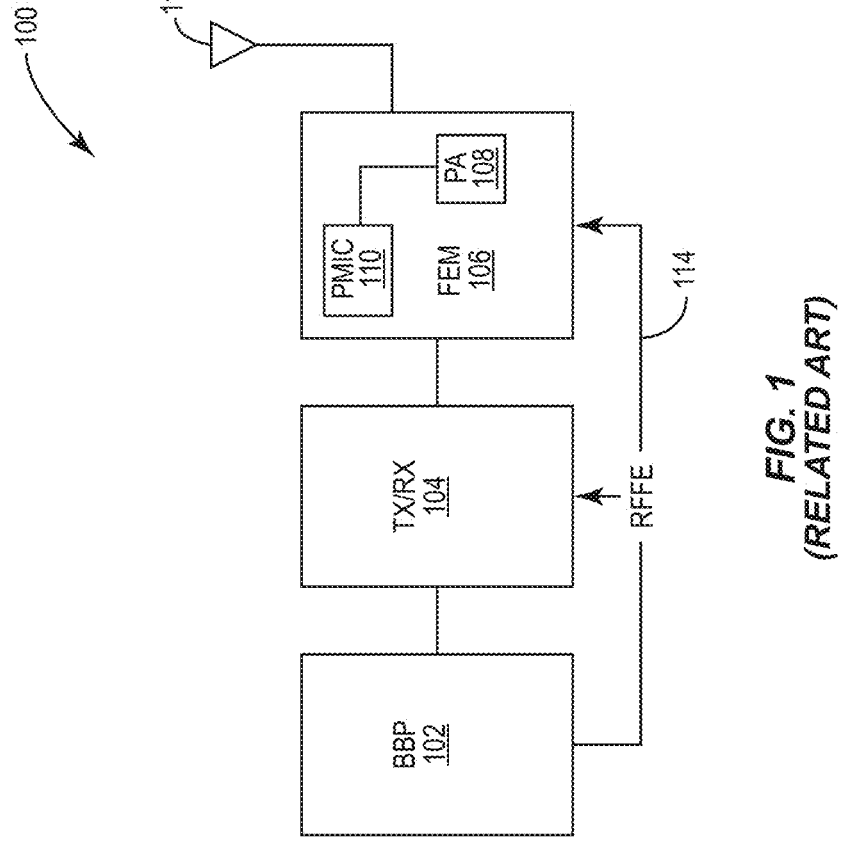
FIG. 1 is a block diagram of an exemplary transceiver chain for wireless communication.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that although the terms first, second, etc. may be used herein to describe various elements, these elements should not be limited by these terms. These terms are only used to distinguish one element from another. For example, a first element could be termed a second element, and similarly, a second element could be termed a first element without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element, or intervening elements may also be present. In contrast, when an element is referred to as being "directly on" or extending "directly onto" another element, no intervening elements are present. Likewise, it will be understood that when an element such as a layer, region, or substrate is referred to as being "over" or extending "over" another element, it can be directly over or extend directly over the other element, or intervening elements may also be present. In contrast, when an element is referred to as being "directly over" or extending "directly over" another element, no intervening elements are present. It will also be understood that when an element is referred to as being "connected" or "coupled" to another element, it can be directly connected or coupled to the other element, or intervening elements may be present. In contrast, when an element is referred to as being "directly connected" or "directly coupled" to another element, no intervening elements are present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In keeping with the above admonition about definitions, the present disclosure uses transceiver in a broad manner. Current industry literature uses "transceiver" in two ways. The first way uses transceiver broadly to refer to a plurality of circuits that send and receive signals. Exemplary circuits may include a baseband processor, an up/down conversion circuit, filters, amplifiers, couplers, and the like coupled to one or more antennas. A second way, used by some authors in the industry literature, refers to a circuit positioned between a baseband processor and a power amplifier circuit as a transceiver. This intermediate circuit may include the up/down conversion circuits, mixers, oscillators, filters, and the like but generally does not include the power amplifiers. As used herein, the term transceiver is used in the first sense. Where relevant to distinguish between the two definitions, the terms "transceiver chain" and "transceiver circuit" are used respectively.

Aspects disclosed in the detailed description include systems and methods for ripple reduction for direct current-to-direct current (DC-DC) converters. In a first aspect, ripple is reduced by measuring a load current proxy and providing a fast-acting feedback loop to the DC-DC converter to adjust current levels to a desired level. In particular, a change in voltage at an output may be measured, and its derivative (dV/dt) calculated and multiplied by a capacitance to determine the load current. In a second aspect, two DC-DC converters are used, where low-frequency current changes are handled by a first DC-DC converter, mid-frequency current changes are handled by the second DC-DC converter, and fast-frequency current changes are handled by the capacitor associated with the capacitance of the first aspect. Either of these aspects will reduce ripple for a load associated with the DC-DC converters. Greater ripple reduction allows for more efficient operation of the load (e.g., a power amplifier), which in turn provides overall power savings and better compliance with the more recent wireless standards.

Figure 2:
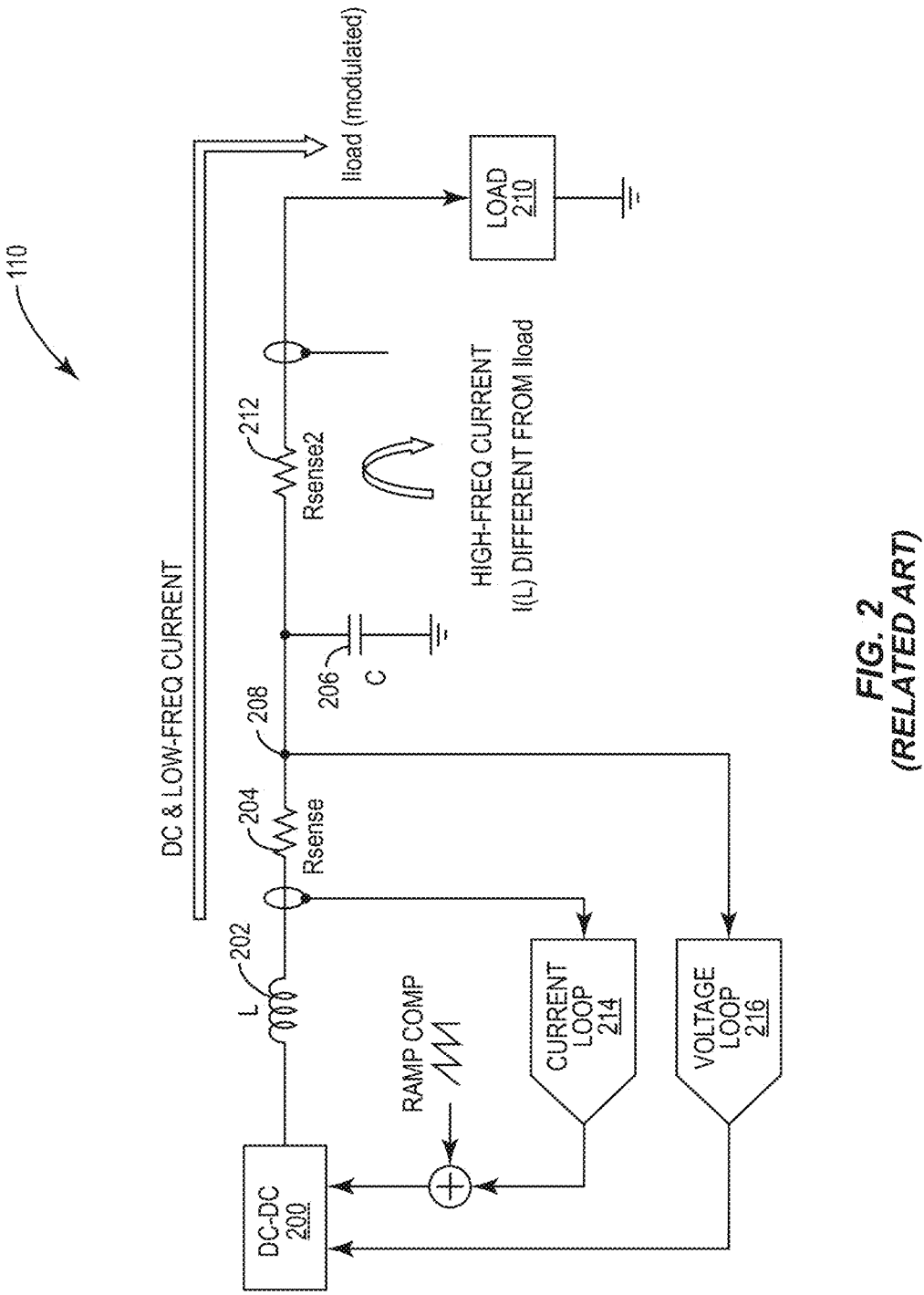
FIG. 2 is a block diagram of a conventional power management integrated circuit (PMIC) having a direct current-to-direct current (DC-DC) converter with output feedback loops.

Before addressing aspects of the present disclosure, a brief bit of context is provided with reference to FIGS. 1 and 2. A discussion of ripple reduction techniques according to the present disclosure begins below with reference to FIG. 3.

In this regard, FIG. 1 is a block diagram of a transceiver chain 100 that may exist in a wireless communication device (not shown in FIG. 1). While applicable to almost any wireless standard, the more current (as of this writing) standards with frequent power level changes (e.g., 5G, WIFI, BLUETOOTH, and the like) may particularly benefit from aspects of the present disclosure. The transceiver chain 100 may include a baseband processor (BBP) 102 that sends signals for transmission to a transceiver circuit 104. The transceiver circuit 104 may upconvert the signals to a desired radio frequency (RF) signal and perform other conditioning operations on the signal to be transmitted. The upconverted signal is then passed to a front-end module (FEM) 106, which may include a power amplifier module 108. To assist in managing power levels, a power management integrated circuit (PMIC) 110 may also be present in the FEM 106. Once amplified, the signal is transmitted through an antenna 112. Additional control or other information may be exchanged between the BBP 102, transceiver circuit 104, and FEM 106 over a control communication bus 114, such as a bus that complies with the radio frequency front end (RFFE) standard published by MIPI.

Additional details about a wireless communication device and a transceiver chain 100 can be found below with reference to FIG. 11. Saliently is the presence of a PMIC that is used to control a supply voltage for one or more amplifier elements in the amplifier module. Control of the supply voltage may be done to assist in efficiency while keeping the amplifier element operating in a desired mode (e.g., avoiding saturation). At least two general forms of PMIC are currently deployed, including average power tracking (APT) and envelope tracking (ET) PMICs.

The current trend, as of this writing, for wireless communication standards is to vary signal power levels in increasingly smaller increments. Whereas historical changes might take place on a frame-by-frame basis, now per slot and even per symbol changes are contemplated. These power level changes put pressure on the PMICs to change the supply voltage for the power amplifier quickly. However, the structure of the PMIC presents challenges as explained better with reference to FIG. 2.

In particular, FIG. 2 illustrates some details about the PMIC 110. The PMIC 110 may include a DC-DC converter 200, which may be a buck-boost converter that outputs a signal to an inductor (L) 202 and resistor (Rsense) 204. A capacitor (C) 206 may couple a node 208 to ground. The node 208 may couple to a load 210 through another resistor (Rsense2) 212. The load 210 may be, for example, a power amplifier in a transceiver chain 100, but could be some other form of load without departing from the present disclosure.

Information from the BBP 102 is used to set a desired current provided to the load 210. To assist in providing the desired current, a current feedback loop 214 may be provided that senses current passing through the inductor 202 and/or the resistor 204. Additionally, voltage feedback loop 216 may be provided that senses voltage at the node 208. Information from the feedback loops 214, 216 may be compared to a target in a comparator, and the signal from the DC-DC converter 200 adjusted.

In practice, the DC-DC converter 200 operates based on a switching clock, which may have a frequency, conventionally, between one and one hundred megahertz (1 MHz-100 MHz). To be stable, the DC-DC converter 200 may be able to switch current levels with a switching frequency or bandwidth of an order of magnitude (give or take) lower (e.g., 100-300 kHz). So long as changes to the load current are at or below this bandwidth, the DC-DC converter 200 can keep up, and the load current comes almost exclusively from the DC-DC converter 200. At more frequent load current changes, the DC-DC converter 200 cannot keep up, and some portion of the load current comes from the capacitor 206. It should be appreciated that drawing current from the capacitor 206 necessarily decreases a voltage level at the node 208 and creates a voltage ripple, which negatively affects the performance of the load 210. In particular, if the voltage ripple is too large, and the load includes a transistor, then the transistor may be saturated or crushed and not operate as desired.

One way to combat the voltage ripple is to increase the size of the capacitance. If the capacitance of the capacitor 206 is large, then this voltage drop may be relatively small and not an issue. However, having a large capacitance consumes valuable real estate within the FEM 106 and is commercially undesirable. Additionally, such a large capacitance may increase the settling speed, which, given that the origin of the base problem is increased switching speed, is also undesirable. Alternatively, the overall voltage may be increased, but such an increase is made at the expense of being less efficient.

It should also be noted that sensing the current at the inductor 202 or resistor 204 does not give the load current (Iload) because there is some current contribution from the capacitor 206. Additionally, the presence of resistors 204 and 212 hurts the ripple and decreases efficiency, so these values are kept as small as practical. Such small values do not lend themselves to viable current sensing. Accordingly, while the current feedback loop 214 is faster than the voltage feedback loop 216, it is not as responsive as might be hoped, given the signal level switching that is occurring under emerging wireless standards.

Exemplary aspects of the present disclosure contemplate measuring a current through the capacitor and using this current as a proxy for Iload to achieve a faster measurement of Iload with the corresponding correction of the DC-DC converter. The faster measurement of Iload allows the correction to be faster and, in turn, a reduction in the ripple.

Figure 3:
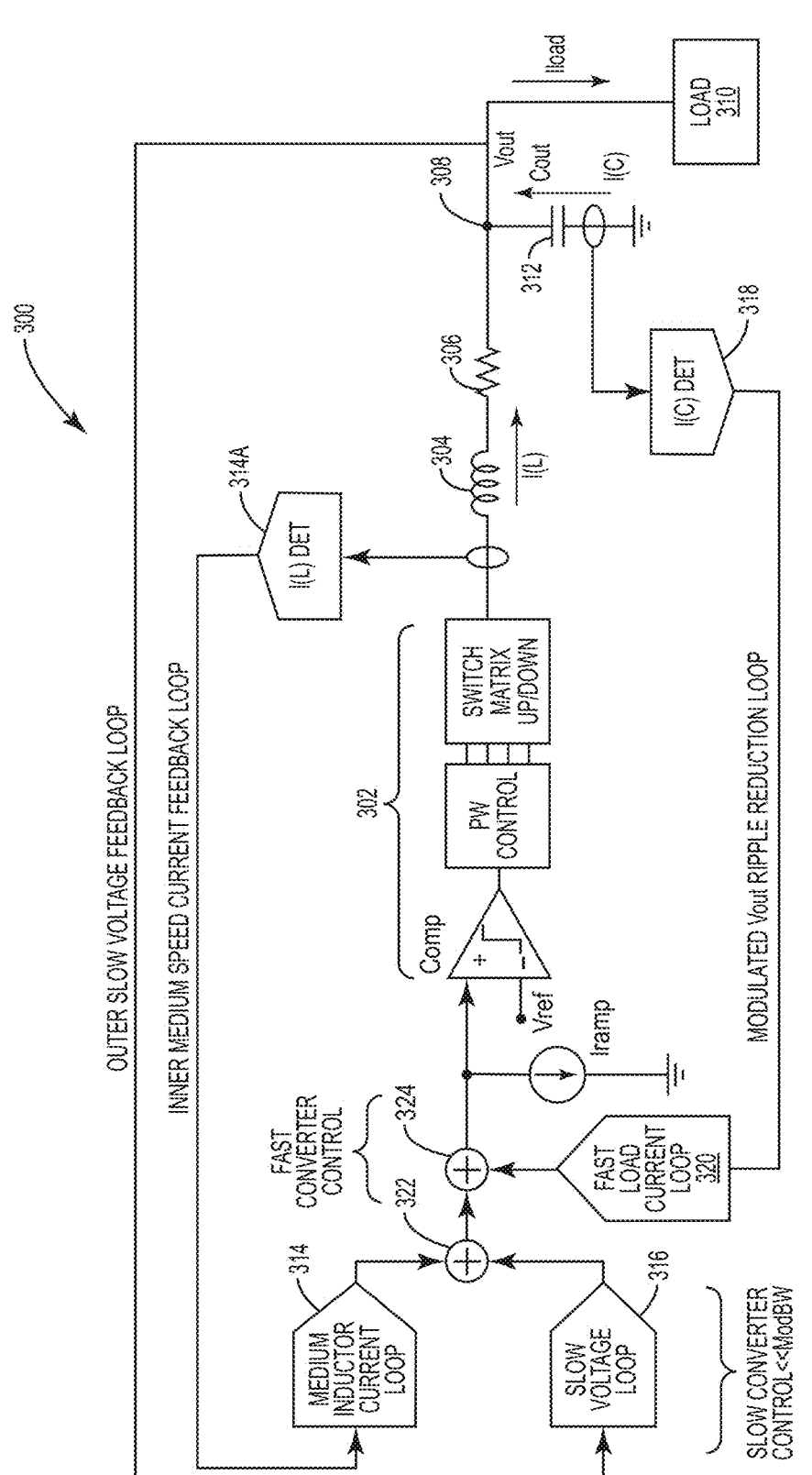
FIG. 3 is a block diagram of a PMIC having a load current sensor according to exemplary aspects of the present disclosure.

In this regard, FIG. 3 illustrates a PMIC 300 with a DC-DC converter 302 that provides a signal to an inductor 304 and a resistor 306 to a node 308. The node 308 provides a supply voltage to a load 310 (e.g., a power amplifier). The node 308 is coupled to ground through a capacitor 312. A "medium" speed current feedback loop 314 provides a sensed current (I(L)) to the DC-DC converter 302. Similarly, a slow-speed voltage feedback loop 316 provides a voltage measurement (Vout) to the DC-DC converter 302. Thus, a current detector 314A may provide a measurement of current through the inductor 304.

Aspects of the present disclosure add a current detector 318 that measures current I(c) through the capacitor 312 to form a "fast" (or alternatively "load") current feedback loop 320. It is appreciated that fast and medium are relative terms that lack a subjective reference point. The voltage Vout changes relatively slowly, so it is considered a slow feedback loop. Similarly, current I(L) in an inductor such as inductor 304 inherently changes relatively slowly, albeit faster than the voltage Vout. By contrast, current I(c) in the capacitor 312 changes effectively instantaneously and thus is fast by comparison.

Note further that the loops 314, 316, in part because of their relatively slow reactions, actually may also provide stability for the DC-DC converter 302. Thus, these signals may be combined at a first combiner 322 and the faster signal from the loop 320 combined at a second combiner 324.

It is further appreciated that measuring current without adding undesired resistance is sometimes challenging.

Figure 4:
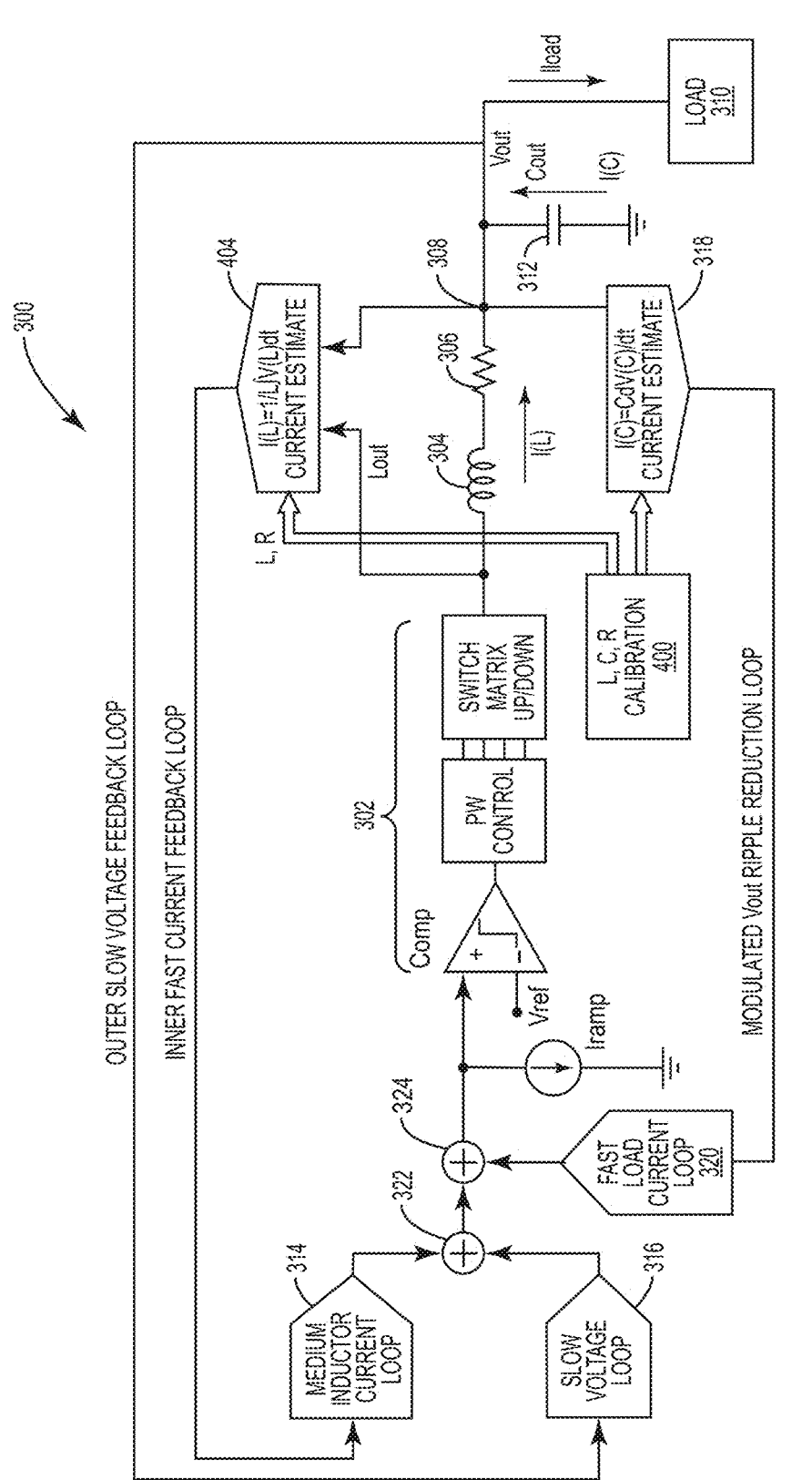
FIG. 4 is a block diagram of the PMIC of FIG. 3 with additional details provided on how to measure current.

Accordingly, aspects of the present disclosure contemplate adding a calibration circuit 400, illustrated in FIG. 4, that calibrates the capacitor 312 to determine a precise value of C as well as precise values of L and R. Then the current detector 318 may actually measure voltage at the node 308 and take the derivative (dV(c)/dt)) thereof. This derivative is I(C). Similarly, a current detector 404 that measures current I(L) may actually measure voltage and take an integral thereof to find I(L).

Figure 5:
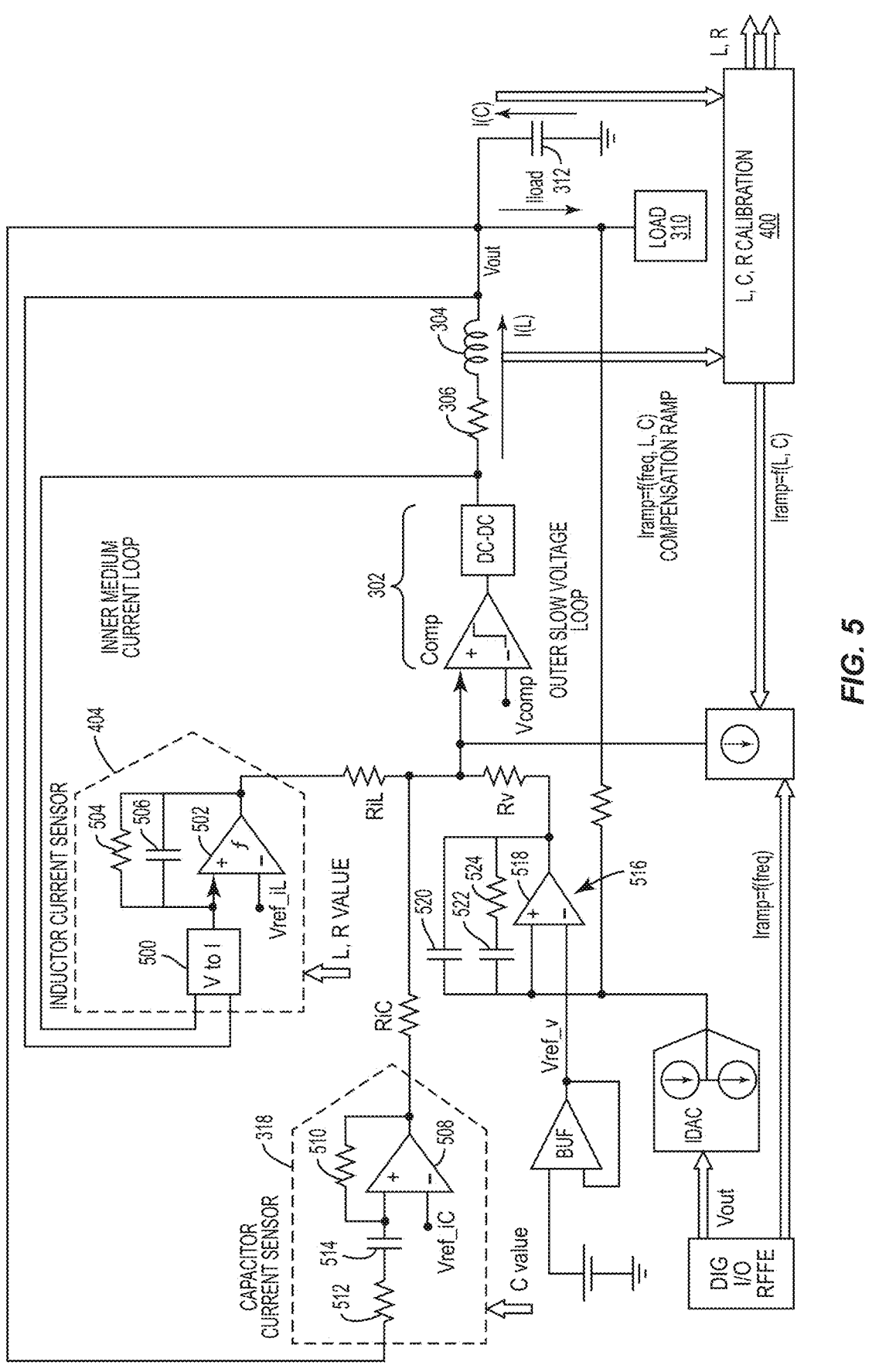
FIG. 5 is a mixed circuit and block diagram of the PMIC of FIG. 3 with additional details.

Additional details about exemplary versions of the loops and detectors are provided in FIG. 5 with the understanding that other topologies may be used without departing from the present disclosure. In particular, the current detector 404 may include two inputs from either side of the inductor 304 (and optionally any resistor 306) that are provided to a converter circuit 500 that converts a voltage to a current. An integrator 502 with feedback resistor 504 and feedback capacitor 506 are used to derive the inductor current (I(L)). The capacitor current detector 318 may be implemented as an operational amplifier (op-amp) 508 with feedback resistor 510 and input resistor 512 serially coupled to input capacitor 514. The voltage detector 516 may likewise include an op-amp 518 with parallel feedback capacitors 520, 522 and feedback resistor 524 that compare the detected voltage to a reference voltage. It should be appreciated that other topologies may be used.

While the aspects disclosed in FIGS. 3-5 provide some ripple reduction, further reduction may be achieved by adding a second DC-DC converter. Further, instead of having two large inductors, one for each DC-DC converter, a smaller inductor may be used for each DC-DC converter, where the sum of the inductances of the two smaller inductors is approximately equal to (or somewhat less than) the inductance of a typical inductor for a conventional DC-DC converter. For example, if a normal single DC-DC converter would have a value of one microhenry (1 μH), then the new split inductors might be approximately 0.33 μH-0.47 μH.

Figure 6:
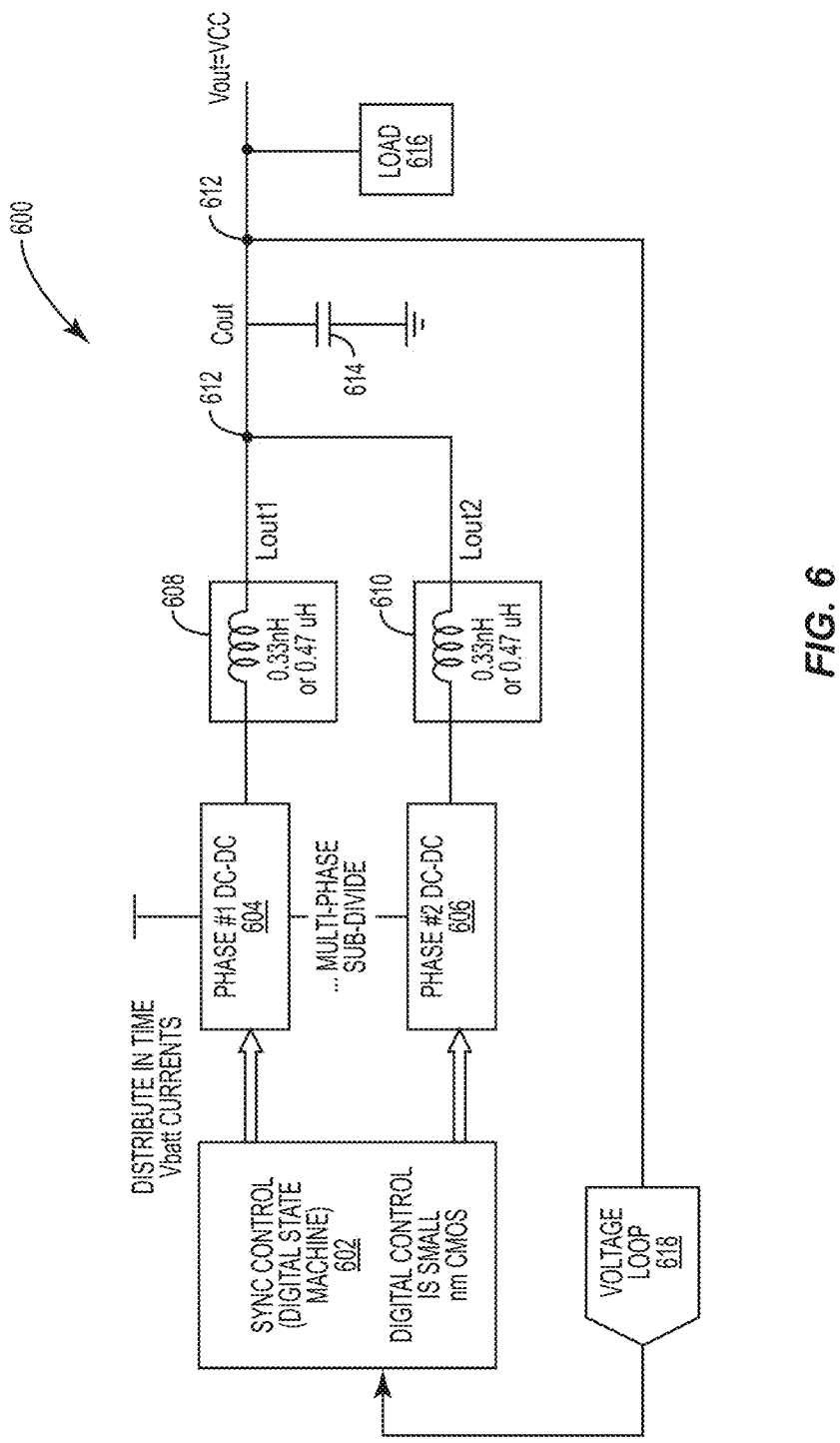
FIG. 6 is a block diagram of a PMIC having two DC-DC converters according to aspects of the present disclosure.

An exemplary block diagram of such a topology is provided in FIG. 6. Aspects of the present disclosure add a digital state machine 602 to a PMIC 600. In one aspect, the digital state machine 602 is integrated into the PMIC 600, but in an alternate aspect, the digital state machine 602 may be in an alternate technology such as complementary metal oxide semiconductor (CMOS) and may be in a separate and distinct chip that communicates with a first DC-DC converter 604 and a second DC-DC converter 606. The first DC-DC converter 604 is coupled to a first inductor 608, and the second DC-DC converter 606 is coupled to a second inductor 610. The inductors 608, 610 output to a common node 612, which is coupled to a ground through a capacitor 614, analogous to capacitor 312 and to a load 616. A voltage feedback loop 618 may measure a voltage at the common node 612 and provide information relating thereto to the digital state machine 602.

As shown in FIG. 6, both DC-DC converters 604, 606 may try to provide supply voltages to the load for all switching frequencies. In particular, a load may have low-frequency, medium-frequency, and high-frequency components. This situation is no better than the original single DC-DC converter of conventional designs. Aspects of the present disclosure contemplate splitting the operation modes of the two DC-DC converters 604, 606, such that the first DC-DC converter 604 operates for low frequencies using a basic clock frequency, and the second DC-DC converter 606 operates at N*clock frequency, wherein N is a positive value greater than 2. For better results, N>4 and may be, for example, around 10. This allows the second DC-DC converter 606 to operate for the medium-frequency and the capacitor 614 provides current for the high-frequency.

Figure 7:
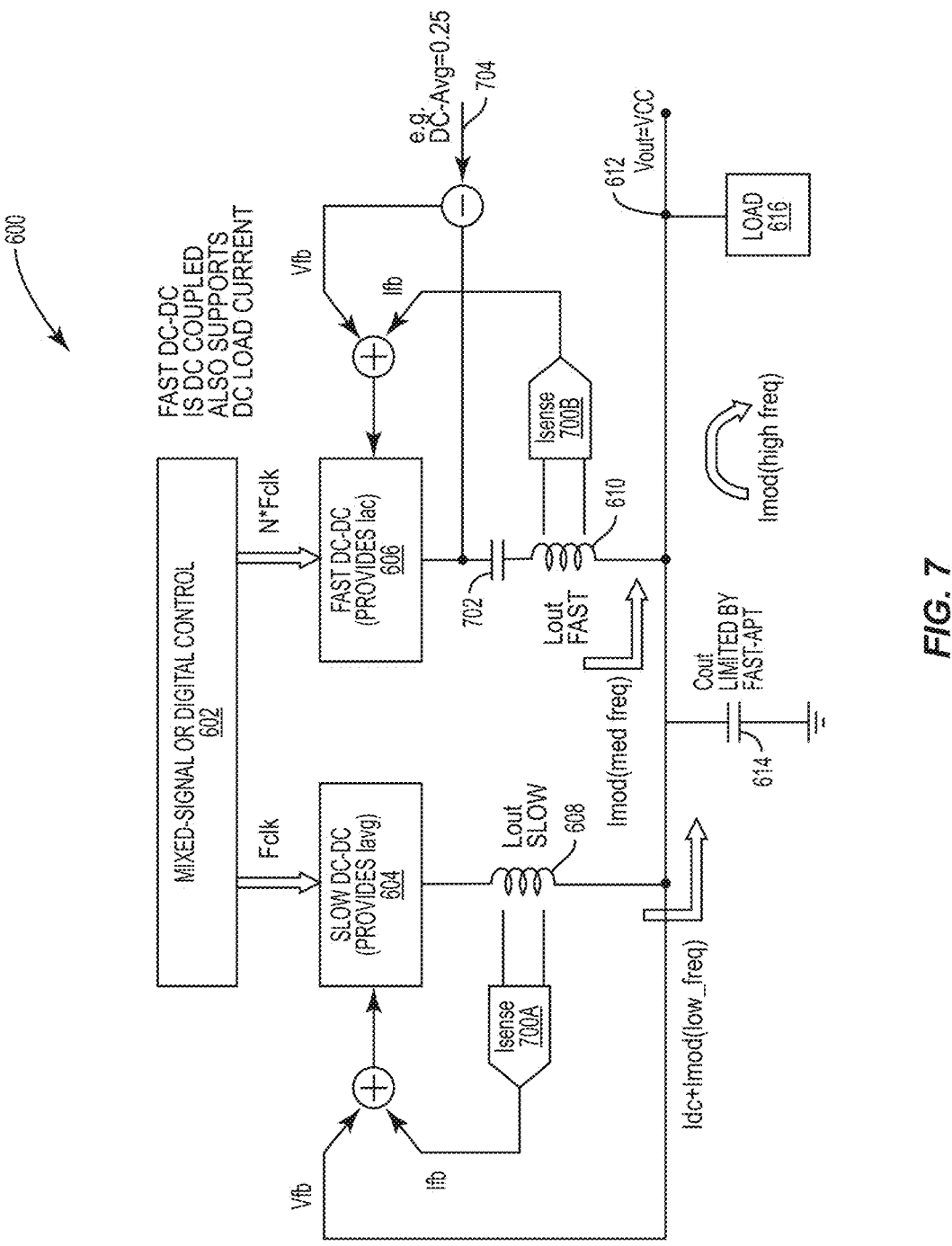
FIG. 7 is a block diagram of the PMIC of FIG. 6 with additional details.

This split function is better illustrated in FIG. 7. Also shown are the split feedback loops. That is, a voltage feedback signal Vfb is provided to both converters 604, 606, but separate current feedback signals are provided from different current sensors 700A, 700B. Still further, a capacitor 702 acts as a DC block that blocks DC signals from the second DC-DC converter 606. Further, to assist in the stability of the second DC-DC converter 606, a duty cycle control signal 704 is provided that keeps the duty cycle average around 0.25.

Figure 8:
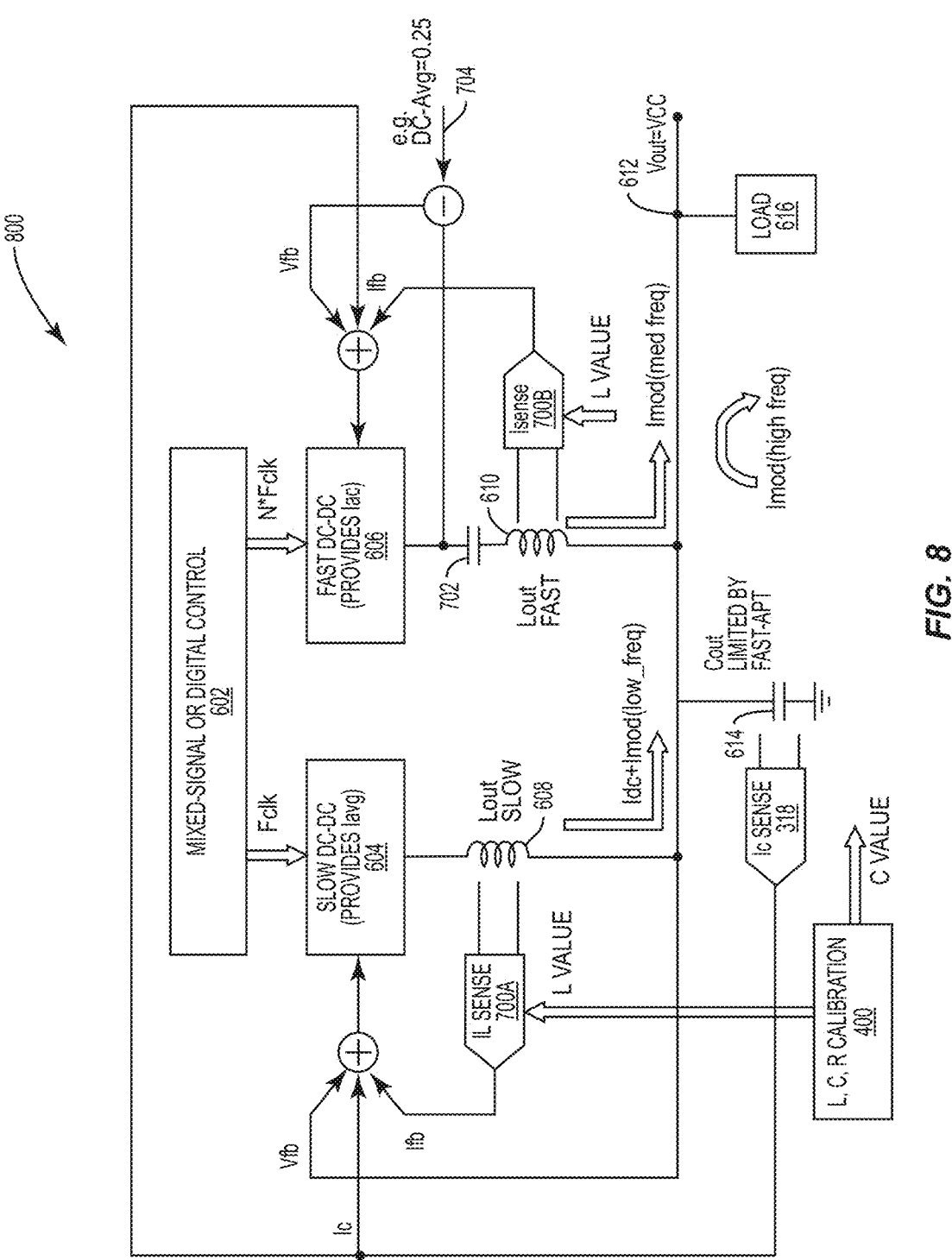
FIG. 8 is a block diagram of the PMIC of FIG. 3 combined with the PMIC of FIG. 6.
Figure 9:
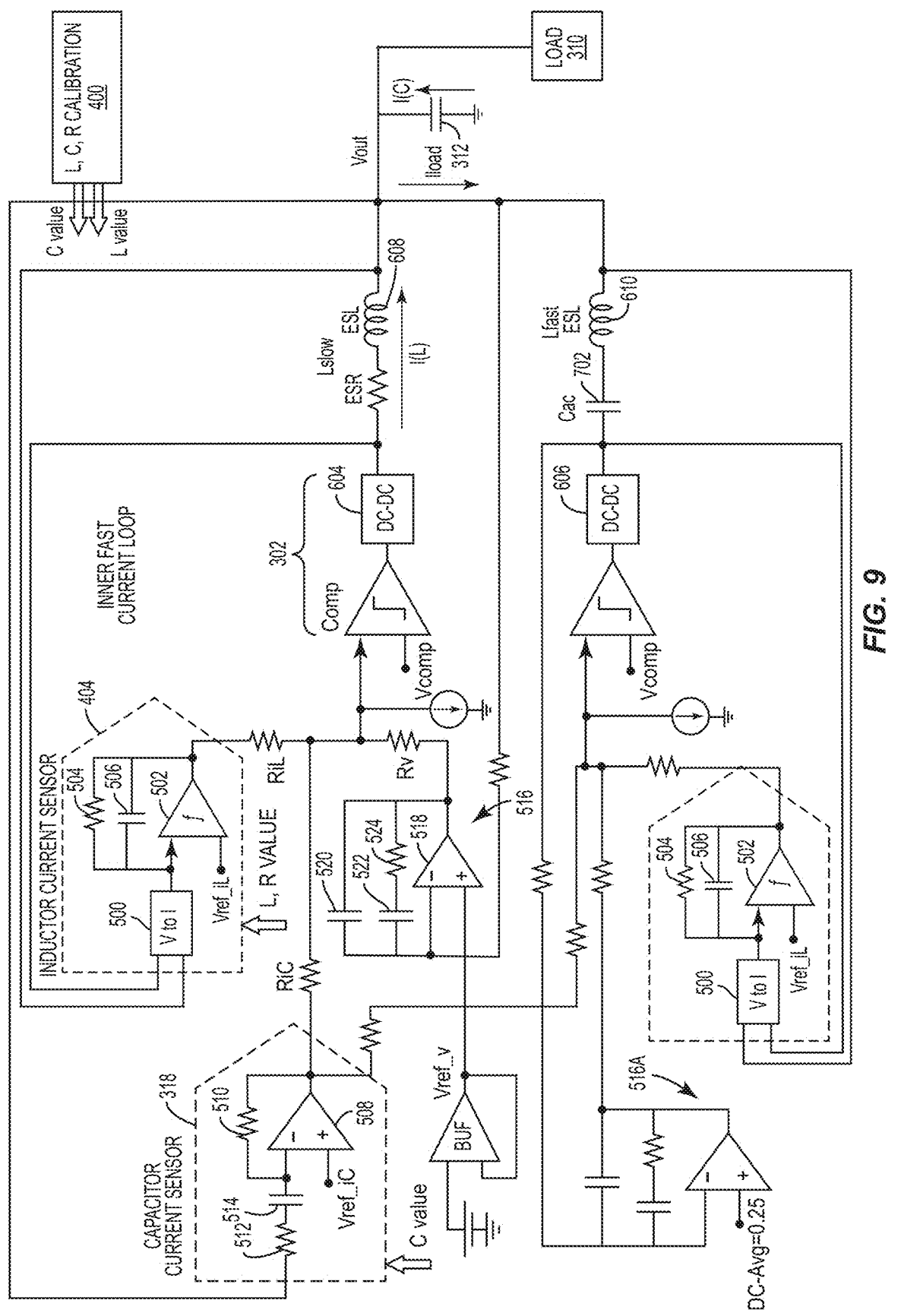
FIG. 9 is a block diagram of the PMIC of FIG. 8 with additional details from FIG. 5.

The two aspects may also be combined as better seen in FIGS. 8 and 9. FIG. 8 illustrates a PMIC 800 that includes both aspects, while FIG. 9 illustrates the PMIC 800 with additional details (i.e., including the hybrid circuits of FIG. 5) about duplicate voltage detectors 516, 516A.

Figure 10:
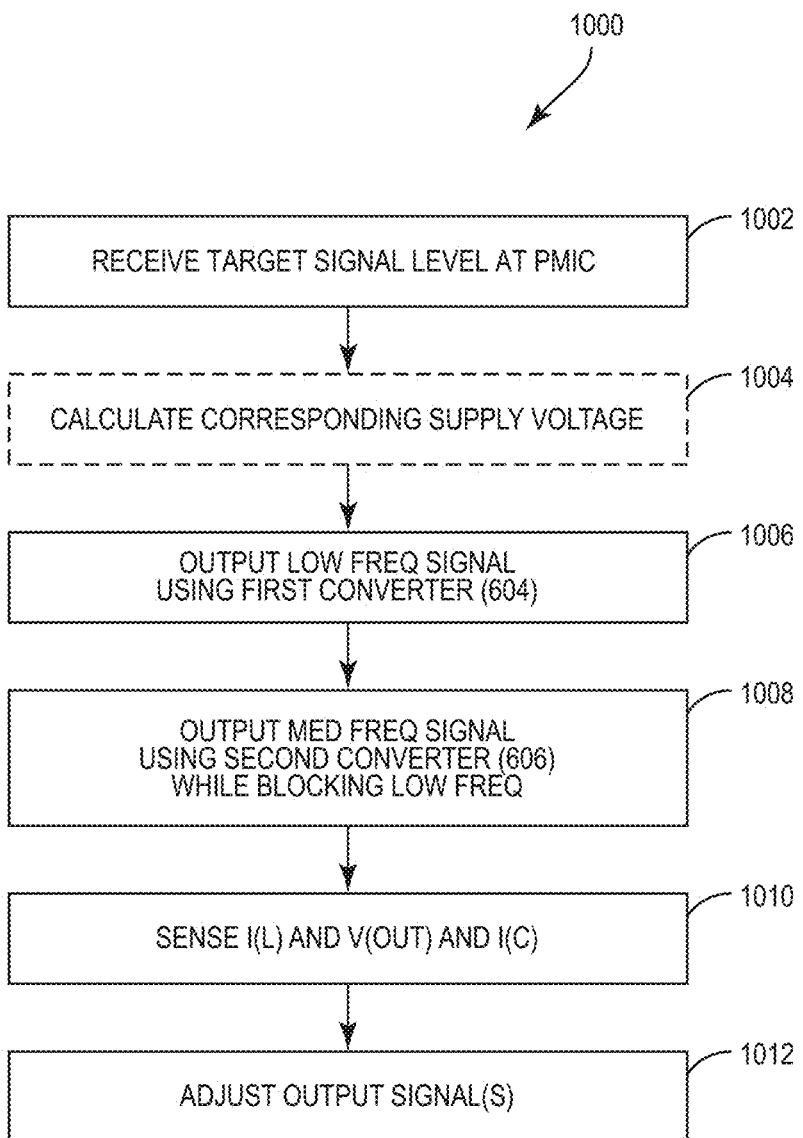
FIG. 10 is a flowchart illustrating an exemplary process for controlling ripple for a PMIC using both aspects of the present disclosure.

FIG. 10 is a flowchart of a process 1000 of managing a supply voltage for a load using a PMIC according to aspects of the present disclosure. The process 1000 starts with receiving a target signal level at the PMIC from the BBP 102 (block 1002). Sometimes this target signal level will include the corresponding supply voltage, but if not, then the PMIC may calculate the corresponding supply voltage (block 1004). Based on this corresponding supply voltage, a low frequency (e.g., DC) signal is output using the first DC-DC converter 604 (block 1006) and a medium frequency (e.g., alternating current (AC)) signal is output using the second DC-DC converter 606 (block 1008), while blocking DC signals using the capacitor 702.

The various sensors associated with feedback loops sense I(L), V(out) and I(C) (block 1010) and provide information back to the DC-DC converters and/or digital state machine, which in turn adjusts the output signals (block 1012).

The ripple reduction techniques according to aspects disclosed herein, may be provided in or integrated into any processor-based device. While specifically contemplated for wireless communication devices that operate in 5G cellular networks, other examples, without limitation, include a set-top box, an entertainment unit, a navigation device, a communications device, a fixed location data unit, a mobile location data unit, a global positioning system (GPS) device, a mobile phone, a cellular phone, a smartphone, a session initiation protocol (SIP) phone, a tablet, a phablet, a server, a computer, a portable computer, a mobile computing device, a wearable computing device (e.g., a smartwatch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 11:
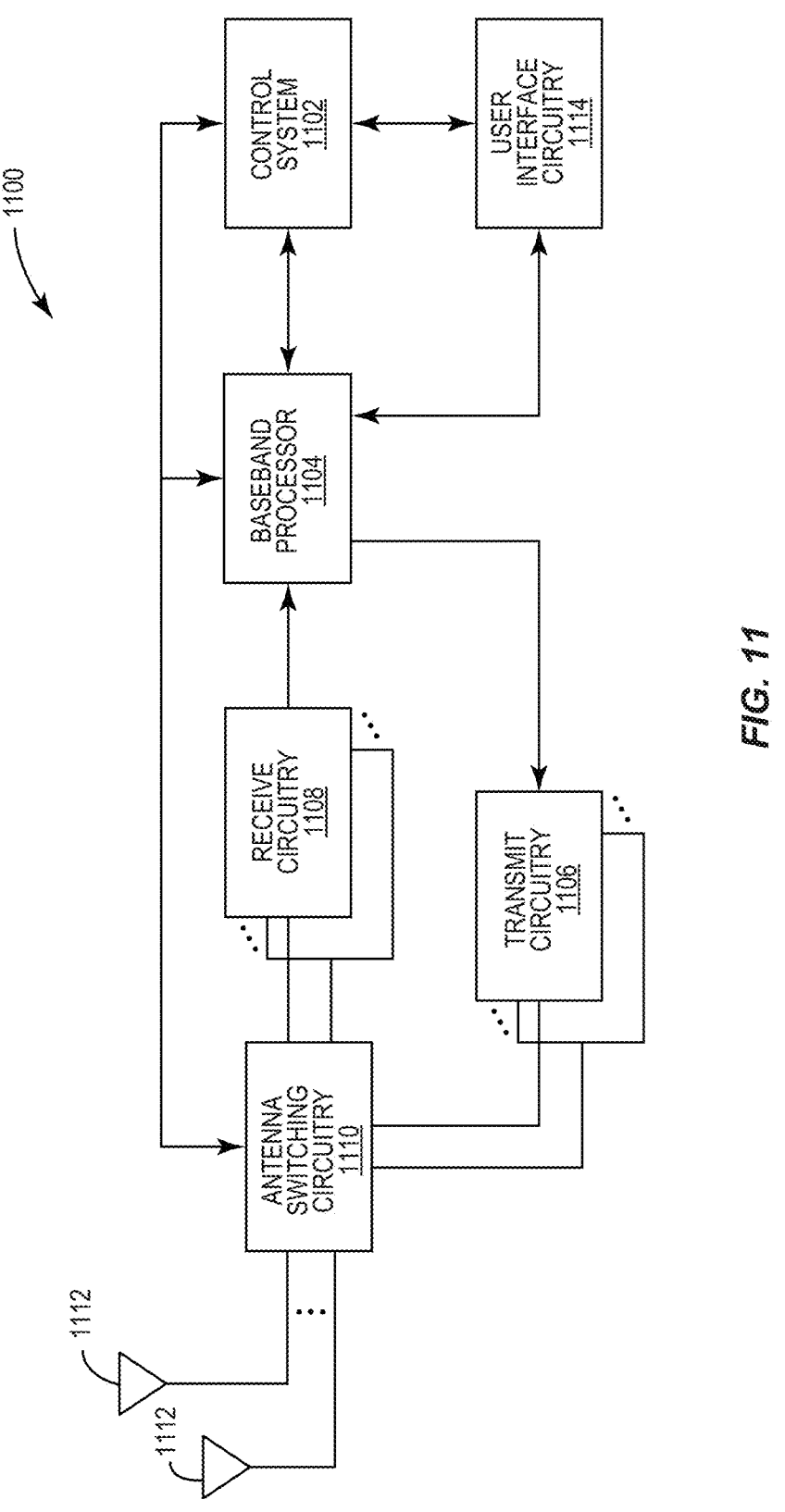
FIG. 11 is a block diagram of a mobile terminal, which may include the PMICs of FIGS. 3-9, according to the present disclosure.

With reference to FIG. 11, the concepts described above may be implemented in various types of user elements 1100, such as mobile terminals, smart watches, tablets, computers, navigation devices, access points, and like wireless communication devices that support wireless communications, such as cellular, wireless local area network (WLAN), Bluetooth, and near field communications. The user elements 1100 will generally include a control system 1102, a baseband processor 1104, transmit circuitry 1106 (analogous to parts of transceiver chain 100), receive circuitry 1108, antenna switching circuitry 1110, multiple antennas 1112, and user interface circuitry 1114. In a non-limiting example, the control system 1102 can be a field-programmable gate array (FPGA) or an application-specific integrated circuit (ASIC), as an example. In this regard, the control system 1102 can include at least a microprocessor(s), an embedded memory circuit(s), and a communication bus interface(s). The receive circuitry 1108 receives radio frequency signals via the antennas 1112 and through the antenna switching circuitry 1110 from one or more base stations. A low noise amplifier and a filter of the receive circuitry 1108 cooperate to amplify and remove broadband interference from the received signal for processing. Downconversion and digitization circuitry (not shown) will then downconvert the filtered, received signal to an intermediate or baseband frequency signal, which is then digitized into one or more digital streams using an analog-to-digital converter(s) (ADC).

The baseband processor 1104 processes the digitized received signal to extract the information or data bits conveyed in the received signal. This processing typically comprises demodulation, decoding, and error correction operations. The baseband processor 1104 is generally implemented in one or more digital signal processors (DSPs) and ASICs.

For transmission, the baseband processor 1104 receives digitized data, which may represent voice, data, or control information, from the control system 1102, which it encodes for transmission. The encoded data is output to the transmit circuitry 1106, where a digital-to-analog converter(s) (DAC) converts the digitally encoded data into an analog signal, and a modulator modulates the analog signal onto a carrier signal that is at a desired transmit frequency or frequencies. A power amplifier (e.g., in the FEM 106) will amplify the modulated carrier signal to a level appropriate for transmission and deliver the modulated carrier signal to the antennas 1112 through the antenna switching circuitry 1110 to the antennas 1112. The multiple antennas 1112 and the replicated transmit and receive circuitries 1106, 1108 may provide spatial diversity. Modulation and processing details will be understood by those skilled in the art.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications, as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

What is claimed is:

1. A power management circuit comprising:
a direct current-to-direct current (DC-DC) converter configured to provide an output control signal to a load at an output node through at least an inductor;
a capacitor having a capacitance C, the capacitor coupling the output node to ground;
a first current sensor associated with the inductor, configured to provide a first current feedback signal;
a voltage sensor associated with the output node, configured to provide a voltage feedback signal;
a second current sensor associated with the capacitor, configured to provide a second current feedback signal; and
a comparator that compares a combined feedback signal based on the first current feedback signal, the voltage feedback signal, and the second current feedback signal to a reference voltage to control the DC-DC converter;
wherein the first current feedback signal and the voltage feedback signal are initially combined by a first adder circuit before the second current feedback signal is combined by a second adder circuit to form the combined feedback signal.

2. The power management circuit of claim 1, wherein the second current sensor measures a change in voltage relative to time (dV/dt) and uses C of the capacitor to determine current.

3. The power management circuit of claim 1, wherein the first current sensor comprises an integrator having a feedback resistor and a feedback capacitor that integrates a sensed voltage across the inductor.

4. The power management circuit of claim 1, further comprising an input configured to receive a signal input.

5. The power management circuit of claim 4, wherein the signal input comprises an envelope tracking signal input.

6. The power management circuit of claim 4, wherein the signal input comprises an average power signal input.

7. The power management circuit of claim 1, further a second DC-DC converter with a second inductor, wherein the DC-DC converter and the second DC-DC converter are collectively configured to provide the output control signal at the output node.

8. The power management circuit of claim 7, further comprising a DC blocking capacitor positioned between the second DC-DC converter and the second inductor.

9. The power management circuit of claim 1 integrated into a device selected from the group consisting of: a set-top box; an entertainment unit; a navigation device; a communications device; a fixed location data unit; a mobile location data unit; a global positioning system (GPS) device; a mobile phone; a cellular phone; a smartphone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

10. The power management circuit of claim 1 integrated into a communication device comprising:
a baseband processor;
a transceiver circuit coupled to the baseband processor; and a front-end module (FEM) comprising the power man-
agement circuit.

11. A method of operating a power management circuit,
comprising:

sensing a first current across an inductor associated with
a direct current-to-direct current (DC-DC) converter
with a first current sensor;

sensing a second current by sensing a change in voltage
for a capacitor at an output node of the DC-DC con-
verter;

sensing voltage at the output node to provide a voltage
feedback signal;

combining the voltage feedback signal with the first
current to form a combination signal;

subsequently combining the combination signal with the
second current to from a combined feedback signal;

comparing the combined feedback signal to a reference
voltage with a comparator; and adjusting the DC-DC converter based on the comparing.

12. The method of claim 11, further comprising providing
part of an output control signal using the DC-DC converter
and providing a second part of the output control signal
using a second DC-DC converter.

13. A power management circuit comprising:

an output node;

a first direct current-to-direct current (DC-DC) converter
coupled to the output node through a first inductor, the
first DC-DC converter, configured to provide low fre-
quencies using a basic clock frequency to an output
control signal at the output node; and a second DC-DC converter coupled to the output node
through a second inductor and a DC blocking capacitor, the second DC-DC converter configured to provide
higher frequencies using an integer multiple of the
basic clock frequency to the output control signal.

14. The power management circuit of claim 13, further
comprising a second capacitor coupling the output node to
ground.

15. The power management circuit of claim 14, further
comprising a current sensor configured to sense a change in
voltage for the second capacitor and derive a sensed current
signal therefrom, wherein the sensed current signal is used
by a current feedback loop to adjust operation of at least the
first DC-DC converter.

16. The power management circuit of claim 13, further
comprising a voltage feedback loop configured to change
operation of at least the first DC-DC converter.

17. The power management circuit of claim 16, further
comprising a current feedback loop configured to change
operation of at least the first DC-DC converter.

18. A method of controlling a power management circuit,
comprising:

outputting a low-frequency signal using a first direct
current-to-direct current (DC-DC) converter based on a
basic clock frequency;

outputting a medium-frequency signal based on an integer
multiple of the basic clock frequency using a second
DC-DC converter while blocking low-frequency sig-
nals from the second DC-DC converter; and adjusting output from at least the first DC-DC converter
using a current feedback loop and a voltage feedback
loop.

\* \* \* \* \*